US 6,687,236 B1

(12) United States Patent
Goldstein

(10) Patent No.: US 6,687,236 B1
(45) Date of Patent: Feb. 3, 2004

(54) METHOD FOR PROVIDING ECHO CONTROL DEVICES IN COMMUNICATION LINKS TO INTELLIGENT PERIPHERALS

(75) Inventor: Peter Goldstein, Zurich (CH)

(73) Assignee: Siemens Schweiz AG, Zurich (CH)

( * ) Notice: Subject to any disclaimer, the term of this patent is extended or adjusted under 35 U.S.C. 154(b) by 709 days.

(21) Appl. No.: 09/618,126

(22) Filed: Jul. 17, 2000

Related U.S. Application Data

(63) Continuation of application No. PCT/CH99/00004, filed on Jan. 6, 1999.

(30) Foreign Application Priority Data

Jan. 15, 1998 (CH) .............................................. 0074/98

(51) Int. Cl.[7] .............................................. H04B 3/20
(52) U.S. Cl. .................................. 370/289; 379/406.01
(58) Field of Search ................................ 370/286–289; 379/3, 406.01, 406.05, 406.06–406.1

(56) References Cited

U.S. PATENT DOCUMENTS

| 4,349,707 A | | 9/1982 | Perrigault et al. | |
|---|---|---|---|---|
| 5,418,778 A | | 5/1995 | Cummiskey et al. | |
| 5,471,527 A | * | 11/1995 | Ho et al. .................... | 379/347 |
| 5,577,116 A | * | 11/1996 | Townsend et al. ...... | 379/406.12 |
| 5,579,301 A | * | 11/1996 | Ganson et al. ................ | 370/229 |
| 5,598,468 A | * | 1/1997 | Ammicht et al. ....... | 379/406.08 |
| 5,668,794 A | * | 9/1997 | McCaslin et al. ........... | 370/288 |
| 5,856,970 A | * | 1/1999 | Gee et al. ................. | 370/286 |
| 5,875,246 A | * | 2/1999 | Houghton ................. | 379/406.05 |
| 5,920,548 A | * | 7/1999 | El Malki .................... | 370/291 |
| 5,953,658 A | * | 9/1999 | Scott ......................... | 455/422.1 |
| 6,014,371 A | * | 1/2000 | Betts .......................... | 370/286 |
| 6,178,162 B1 | * | 1/2001 | Dal Farra et al. ........... | 370/286 |
| 6,282,286 B1 | * | 8/2001 | Reesor et al. .......... | 379/406.05 |
| 6,310,864 B1 | * | 10/2001 | Thoenes et al. ............ | 370/286 |
| 6,385,176 B1 | * | 5/2002 | Iyengar et al. .............. | 370/286 |
| 6,434,110 B1 | * | 8/2002 | Hemkumar ................. | 370/201 |
| 6,442,272 B1 | * | 8/2002 | Osovets .................. | 379/406.01 |
| 6,507,653 B1 | * | 1/2003 | Romesburg ............ | 379/406.05 |
| 6,526,139 B1 | * | 2/2003 | Rousell et al. ......... | 379/406.03 |
| 6,532,289 B1 | * | 3/2003 | Magid .................... | 379/406.01 |
| 6,570,985 B1 | * | 5/2003 | Romesburg ............ | 379/406.08 |
| 6,574,336 B1 | * | 6/2003 | Kirla ...................... | 379/406.01 |
| 6,580,793 B1 | * | 6/2003 | Dunn et al. ............ | 379/406.04 |
| 6,580,794 B1 | * | 6/2003 | Ono ....................... | 379/406.08 |

OTHER PUBLICATIONS

Published International Application No. WO 97/18640 (Betts), dated May 22, 1997.
"Digitale Kommunikationsnetze Prinzipien, Einrichtungen, Systeme" (Gerke), dated 1998, Springer Verlag, pp. 266–267, pertains to digital communication networks.
"Echo Control Logic, Annex A, COM 11–R 13–E"dated Mar. 19, 1997, pp. 12–17.

* cited by examiner

Primary Examiner—Douglas Olms
Assistant Examiner—Van Nguyen
(74) Attorney, Agent, or Firm—Laurence A. Greenberg; Werner H. Stemer; Ralph E. Locher

(57) ABSTRACT

A method is described concerning echo suppression in connections from a terminal to an automatic machine in a communications network. The communications network contains echo control devices that can be requested if required and that can be inserted on the basis of predetermined criteria during the established connection in order to suppress echo signals arising therein. In the corresponding switching nodes to which the automatic machines are connected, a comparison is made between the signal propagation time vlz of the connection from the terminal to the automatic machine and the value of the echo propagation time compensation elk of an echo control device optionally available in the automatic machine or an echo control device assigned to the automatic machine after a connection has been established between the terminal and the automatic machine. If the criteria vlz>½ elk is met, an echo logic provided in the switching nodes enables the transmission of a signal to the communications network in order to request an echo control device be inserted in the connection between the terminal and the automatic machine.

8 Claims, 3 Drawing Sheets

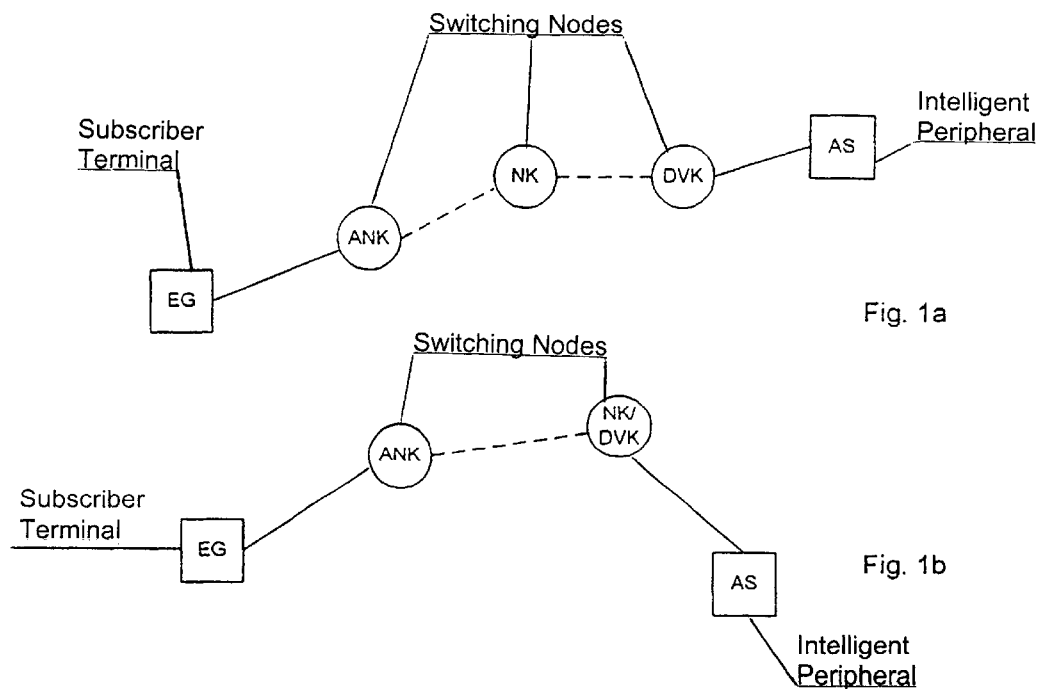
Fig. 1a
Fig. 1b
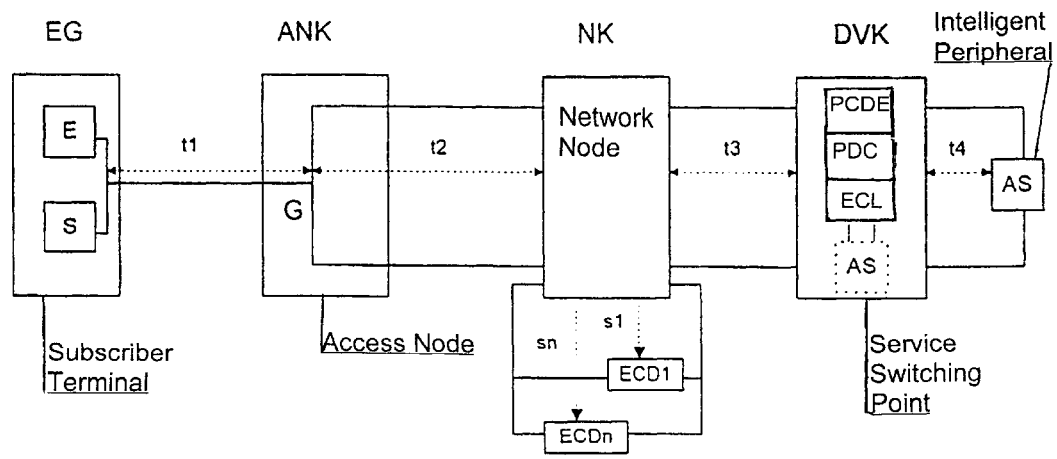
Fig. 2

METHOD FOR PROVIDING ECHO CONTROL DEVICES IN COMMUNICATION LINKS TO INTELLIGENT PERIPHERALS

CROSS-REFERENCE TO RELATED APPLICATION

This is a continuation of copending International Application PCT/CH99/00004, filed Jan. 6, 1999, which designated the United States.

BACKGROUND OF THE INVENTION

Field of the Invention

The present invention relates to a method for echo compensation in connections in a communications network. A connection is setup from a terminal to an intelligent peripheral through the communications network. The intelligent peripheral is coupled to an access node of the communications network and has an echo control device for providing echo compensation. The communications network has further echo control devices that can be requested if required and can be inserted into established connections in order to suppress any occurring echo signals.

It is known that in communications between persons, echo signals are undesirable in the telecommunication networks if the propagation time of the echo exceeds a certain value.

This is because the echo signals disturb the parties involved in the connection. The echo signals are produced by unavoidable reflections at the 2-wire/4-wire transition in the so-called hybrid and/or by direct acoustic coupling in the subscriber terminal. To reduce or completely eliminate the echo signals in links (connections) with relatively long propagation times, network operators provide echo control devices, e.g. echo suppressors or echo cancellers, which are activated when required and are inserted into the links, in certain switching nodes of the network.

The echo control logic in the switching node decides on the basis of various criteria whether an echo control device must be inserted for a certain link. These criteria are:

a) permanently programmed routing data containing information on the distance (and thus on the propagation time) between an origin and a destination of a link, the echo control device being inserted when a certain distance is exceeded;

b) the propagation time of the useful signal, which is determined dynamically when a connection is set up;

c) information relating to terminal/line (with or without echo source), i.e. information providing a clue on whether or not an echo is produced in a line or terminal; and d) information relating to the provision of echo control devices which is received from other switching nodes involved in the setting-up of the connection.

In this configuration, the echo control logic in each case attempts to activate an echo control device which is as close as possible to the echo source. The echo control devices can be provided in accordance with International Telecommunication Union (ITU) Recommendation Q.115(97). This recommendation describes where in the network such devices are to be preferably provided and what procedures are to be used for activating them.

The echo problem is different in communications between a person and an intelligent peripheral. Intelligent peripherals are used, for example, in a so-called intelligent network. They are used when a subscriber is using a special service.

If, for example, the subscriber wishes to establish an arbitrary connection from an arbitrary location without involving a cash payment, he can first set up a service link and will then be connected to an intelligent peripheral. The intelligent peripheral checks the authorization etc. of the subscriber, then accepts his call request and finally initiates the establishment of the required connection. The fees for the connection are then charged to the current telephone account of the subscriber.

The user communicates with the intelligent peripheral from his terminal by use of voice signals or frequency code signals.

In contrast to the normal voice communication between two subscribers, where an echo only causes interference above a certain propagation time, an echo occurring during the dialog between a subscriber and an intelligent peripheral is an interference factor which impairs the evaluation of the received signals (voice recognition or frequency code recognition) in the intelligent peripheral, independently of its propagation time. A solution for bypassing this problem consists in allowing voice or frequency code information to be input only within certain time windows during the dialog with the intelligent peripheral, i.e. the dialog of a subscriber with the intelligent peripheral is carried out in a half duplex mode. This solution allows for a simpler construction of the intelligent peripheral since it does not require any measures for echo control. However, carrying out a dialog in the half duplex mode is cumbersome and time consuming for practiced users, especially if the announcement texts output by the intelligent peripheral are multilingual and/or if the signal propagation times are long, as is the case with long links (e.g. satellite links). Moreover, the resources are in use for relatively long time intervals, which is why this solution is only suitable for automatic information service machines which are dialed up via special service codes, or for answering machines.

In the solution where, in contrast, a normal, i.e. natural, dialog, if possible, is required, an echo control function must be provided for the intelligent peripheral. In this configuration, the intelligent peripheral itself can be equipped with an echo control device or an echo control device can be allocated to it permanently or on request in its network access node. In the text that follows, the two cases (control device disposed in the intelligent peripheral or allocated to the intelligent peripheral) will be called "own" echo control. This solution is more user-friendly and the relevant resources are only in use for as long as they are actually needed. Moreover, the connection set-up time is shorter in comparison with the first-mentioned solution. However, these advantages must be paid for with a more complex equipment level of the intelligent peripheral or of its access node, respectively. In addition, the echo propagation time compensation of the echo control device of the intelligent peripheral cannot be configured to be of any arbitrary size since otherwise the expenditure for the components required for this (memory, high-performance computer) becomes disproportionately high.

SUMMARY OF THE INVENTION

It is accordingly an object of the invention to provide a method for providing echo control devices in communication links to intelligent peripherals that overcome the above-mentioned disadvantages of the prior art methods and devices of this general type, which is effective in every case and requires relatively little expenditure.

With the foregoing and other objects in view there is provided, in accordance with the invention, a method for providing echo compensations, which contains the steps of setting up a connection from a terminal to an intelligent peripheral through a communications network. The intelligent peripheral is coupled to an access node of the communications network and has an echo control device for providing echo compensation. The communications network has further echo control devices that can be requested if required and can be inserted into established connections in order to suppress any occurring echo signals. Subsequently, in the access node, a signal propagation time vlz of the connection from the terminal to the intelligent peripheral is compared with a value of an echo propagation time cancellation elk of the echo control device of the intelligent peripheral. An information item is output into the communications network to request an addition of one of the further echo control devices in the communications network if the condition vlz>½ elk is met.

The method according to the invention exhibits the advantage that echo signals occurring in links to the intelligent peripheral are suppressed even when the echo control of the intelligent peripheral is not sufficient. In such a case, additional devices for echo control, if available in the network, are utilized in dependence on the echo control device of the intelligent peripheral and in dependence on the signal propagation time of the link. For this reason, the expenditure for the echo control device of the intelligent peripheral echo control can be limited. The method guarantees echo suppression in every case independently of the geographic extent of the communication network or of the value of the signal propagation times occurring therein.

In accordance with an added feature of the invention, there are the steps of deriving a signal propagation time vlze from the equation:

$$vlze = vlz - t1,$$

where t1 is the signal propagation time between the terminal and an echo source in a further access node of the communications network associated with the terminal. In the access node for the intelligent peripheral, the signal propagation time vlze is compared with the value of the echo propagation time cancellation elk of the intelligent peripheral; and the information item is output into the communications network in order to request an addition of one of the echo control devices available in the communications network if the condition vlze>½ elk is met.

In accordance with an additional feature of the invention, there is the step of deriving the signal propagation time vlze by transmitting separately a value of the signal propagation time t1 and then subtracting the value of the signal propagation time t1 from the signal propagation time vlz in the access node for the intelligent peripheral.

In accordance with another feature of the invention, there are the steps of acquiring and deriving in the access node for the intelligent peripheral both the signal propagation time vlz and the signal propagation time vlze.

With the foregoing and other objects in view there is further provided, the combination of a terminal and an intelligent peripheral having an echo compensation device generating an echo propagation time cancellation signal elk, with a system for providing echo compensation in a connection between the terminal and the intelligent peripherals. The system contains a communications network connecting the terminal to the intelligent peripheral. The communications network has further echo control devices and switching nodes connected to the further echo control devices. The switching nodes include a first access node for connecting to the intelligent peripheral and a second access node for connecting to the terminal. The further echo control devices can be requested when required and can be inserted into established connections in order to cancel any echo signals which occur. The first access node for the intelligent peripheral has an echo control logic for performing a comparison between one of a first signal propagation time vlz and a second signal propagation time vlze and the echo propagation time cancellation signal elk of the intelligent peripheral. The echo control logic can request that one of the further echo control devices be available if one of vlz>½ elk and vlze>½ elk is met.

In accordance with a concomitant feature of the invention, the first access node has a propagation delay counter for registering the signal propagation time vlz and a further propagation delay counter for registering the signal propagation time vlze, and propagation time values required for determining the signal propagation time vlz and the signal propagation time vlze can be transmitted to the switching nodes involved in a connection by use of a signaling protocol.

Other features which are considered as characteristic for the invention are set forth in the appended claims.

Although the invention is illustrated and described herein as embodied in a method for providing echo control devices in communication links to intelligent peripherals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1a and 1b are block diagrams of two different configurations of intelligent peripherals for a link between a person and an intelligent peripheral in a communication network;

FIG. 2 is a block diagram of details of the link between the subscriber and the intelligent peripheral that extends over a number of exchanges/switching nodes according to the invention.

DESCRIPTION OF THE PREFERRED EMBODIMENTS

Figure 3A:
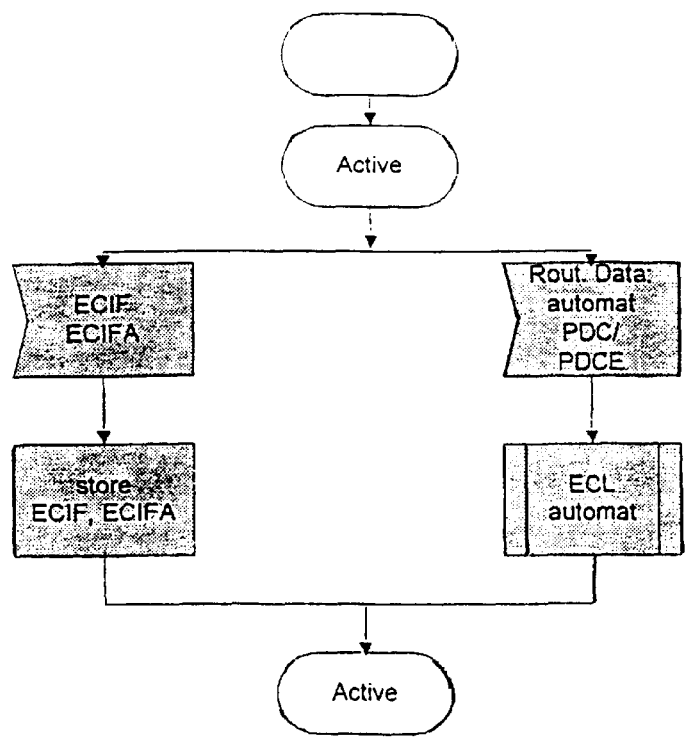
FIGS. 3a, 3b, and 3c are flow charts showing state and procedure diagrams for the method according to the invention.

In all the figures of the drawing, sub-features and integral parts that correspond to one another bear the same reference symbol in each case. Referring now to the figures of the drawing in detail and first, particularly, to FIG. 1a thereof, there is shown a communication link extending from a subscriber terminal EG through various switching nodes ANK, NK and DVK of a communication network to an intelligent peripheral AS. The link includes both user signal channels and signaling channels. The subscriber terminal EG is connected to the network via an access node ANK. The intelligent peripheral AS is connected to the network via a service switching point DVK. The service switching point DVK is a node that is exclusively used for handling automatic communication services. Naturally, a number of intelligent peripherals AS can also be connected to the service switching point DVK. A network node NK, for example a transit node, is located between the nodes ANK and DVK. Depending on the network architecture, further nodes can be located between the nodes ANK and DVK, i.e. depending on the route taken by the link between the terminal EG and the intelligent peripheral AS via the communication network.

FIG. 1b shows a communication link extending from the subscriber terminal EG via the switching nodes ANK and NK/DVK of the communication network to the intelligent peripheral AS. The switching node NK/DVK is a node that is constructed both as a normal network switching node and as a service switching point. Here, too, further switching nodes are conceivable in the link between the terminal EG and the intelligent peripheral AS.

In certain switching nodes of the communication network, echo control devices, known per se, are provided which can be inserted into a link when unwanted echo signals occur. These devices are configured, or disposed in the network, in such a manner that they can suppress echoes with all echo propagation times occurring in the network. There are two possibilities for providing echo control devices: the devices can be allocated permanently to certain lines in a switching node. However, they can also be provided in a pool exhibiting a number of echo control devices as is indicated in FIG. 2 for the node NK containing echo control devices ECD1 ... ECDn. Where necessary, i.e. when echo suppression is requested during the setting-up of a connection, a permanently allocated echo control device is activated or, respectively, one of the echo control devices from the pool is inserted into the relevant link and activated with a control signal s. ITU Recommendation Q.115(97), titled "Logic For The Control Of Echo Control Devices" and its Appendix A provides recommendations on providing and operating echo control devices in communication networks.

When a special service is used, such as, e.g. in the case of telephoning "on account" from an arbitrary location as mentioned initially, the intelligent peripheral is in each case permanently connected for a limited time to the relevant subscriber. The intelligent peripheral interrogates the subscriber for relevant information for handling the requested service and then initiating the service required by the subscriber. As soon as the requirement of the subscriber is met, i.e. when the required connection has been set up, the intelligent peripheral disconnects itself again and is available for another user.

FIG. 2 shows details of the connection between the subscriber terminal EG and the intelligent peripheral AS connected to the service switching point DVK, as shown in FIG. 1a. The intelligent peripheral AS could also be integrated directly in the service switching point DVK. In this case, the usual connecting line between the intelligent peripheral AS and the switching point DVK is omitted. The terminal EG is a communication device such as, e.g. a telephone set containing a transmitter S (microphone) and a receiver E (loudspeaker), which is connected to the access node ANK via a two-wire line. The two-wire/four-wire conversion is carried out by a familiar hybrid G. The connection is conducted as a four-wire connection via the switching nodes ANK, NK and the service switching point DVK to the intelligent peripheral AS. It is indicated in FIG. 2 that the intelligent peripheral AS can either be integrated directly in the service switching point DVK or can be connected externally to the point DVK. In the latter case, the connection from the service switching point DVK to the intelligent peripheral AS is established, e.g. by the DSS1 protocol. Time indicators t1, t2 and t3 designate the signal propagation times between the terminal EG and the switching node ANK and, respectively, between the switching nodes ANK, NK and DVK involved in the connection. Time indicator t4 is the propagation time between the service switching point DVK and the intelligent peripheral AS. A voice signal output by the intelligent peripheral AS—e.g. an announcement text—thus arrives with a delay of vlz=t1+t2+t3+t4 in the terminal EG where the intelligent peripheral AS is external. A part of the signal is reflected at the hybrid G in familiar manner and returns to the intelligent peripheral AS as an echo signal with a delay (echo propagation time) tv=2(t2+t3+t4). The echo signal is unwanted since it can have an interfering effect on the operation.of the intelligent peripheral AS.

To render the echo signal ineffective, measures for echo compensation must be provided in the intelligent peripheral AS or at other places in the network, e.g. in an access node of the intelligent peripheral AS. For this purpose, so-called echo cancellers are used today. The principle of such cancellation configurations is described, e.g. in the reference by Peter R. Gerke, titled "Digitale Kommunikationsnetze [Digital Communication Networks]" (Berlin 1991)" or in ITU Recommendations G.164 and G.165, which is why it will not be discussed in greater detail here. The requirements for the computer power and the expenditure for the necessary memories in such configurations increase with an increase in the value of the echo propagation time to be canceled. In practice, therefore, configurations will be used which only suppress or cancel echo signals up to a certain value of their propagation time. In the case of relatively long links, therefore, this value can be exceeded, which is why the echo signals are then no longer canceled and can have a disadvantageous effect on the operation of the intelligent peripheral AS as mentioned.

To ensure echo cancellation even in the cases where the echo cancellation of the intelligent peripheral AS is not adequate, it is then provided according to the invention to equip the switching nodes to which intelligent peripherals AS are connected with an echo control logic ECL—also called control logic for short in the text which follows. The control logic ECL, e.g. of the service switching point DVK (FIG. 2), knows the value of the intelligent peripheral AS own echo propagation time cancellation "elk". The value elk can be input into a special data memory of the service switching point DVK, e.g. by the network operator. Furthermore, the above-mentioned delay or propagation time vlz of the signal via the set-up connection from its origin to the intelligent peripheral AS connected to the service switching point DVK is stored in a propagation delay counter (PDC) (see FIG. 3a) of the service switching point DVK. When a connection is being set up, the propagation times between the switching nodes involved in the link are in each case added together, stored and transmitted to the next switching node. Thus, the result vlz is available in the propagation delay counter PDC of a destination switching node, in the present case the service switching point DVK, after the connection setup has been completed. The service switching point DVK also knows the propagation time t4 to the intelligent peripheral AS connected to it. The propagation times necessary for determining the cumulative signal propagation time vlz in the destination switching node are transmitted in familiar manner by use of ISUP (ISDN User Part) signaling, a signaling protocol of the ITU signaling system No. 7, between the switching nodes.

In the example of FIG. 2 it is initially assumed that the signal propagation time t1 between the terminal EG and the hybrid G is negligible. The echo component of a signal output from the intelligent peripheral AS to the terminal EG, reflected at the hybrid G, arrives back at the integrated peripheral AS with a delay tv=2(t2+t3) when the intelligent peripheral AS is integrated in the service switching point DVK and tv=2(t2+t3+t4) when the intelligent peripheral AS is connected externally to the service switching point DVK. Using this value as a basis, the control logic ECL of the switching service point DVK compares the value vlz=t1+t2+t3 or, respectively, vlz=t1+t2+t3+t4, stored in the propagation delay counter PDC, with the value of the intelligent peripheral AS own echo propagation time cancellation elk, depending on how the connection between the terminal EG and the intelligent peripheral AS has been established. If $$vlz=t1+t2+t3=t2+t3>\tfrac{1}{2}\text{ elk or}$$

$$vlz=t1+t2+t3+t4=t2+t3+t4>\tfrac{1}{2}\text{ elk}$$

on the assumption of the negligible propagation time t1, the echo propagation time cancellation provided by the intelligent peripheral AS or, respectively, in the service switching point DVK, is not sufficient for canceling the echo signal present. For this reason, the control logic ECL of the service switching point DVK in this case sends information into the communication network for requesting a further echo control device that may be available in the network.

According to ITU Recommendation Q.115(97), relevant information for the echo control logic is also transmitted in addition to the familiar connection information when a connection is set up via a communication network between the networks involved. The following echo control information is provided:

ECIF: Echo Control Information Forward

ECIB: Echo Control Information Backward

ECRF: Echo Control Request Forward

ECRB: Echo control Request Backward

ECIFA: Echo Control Information Forward, Additional

ECIBA: Echo Control Information Backward, Additional

The information ECIF, ECIFA, ECIB and ECIBA are part of the connection set-up information and are transmitted with each connection set-up. ECIF and ECIFA are transmitted in the connection set-up direction (from calling to called subscriber), ECIB and ECIBA in the reverse direction. In contrast, the information ECRF and ECRB is normally provided when echo cancellation becomes necessary in a connection which already exists. Such a constellation occurs when, as described above, the service switching point DVK requests a further echo control device be available in the network in order to render ineffective an echo signal interfering in the intelligent peripheral. The control logic of the service switching point DVK therefore returns an ECRB information item to the switching node NK in dependence on the ECIFA information, which specifies whether an echo control device is available in a preceding switching node. If the communication network is correctly dimensioned, an echo control device is available in every case. The echo control device ECDi is then activated and remains in the connection for as long as the connection exists.

The assumption made above that t1 is negligible applies as a rule. However, in order to reliably eliminate any echo signals occurring even in cases where this assumption is not correct, an additional "echo" propagation delay counter PDCE (FIG. 3a), which covers the value vlze=t2+t3 or, respectively, vlze=t2+t3+t4 in the relevant switching node, is provided in a development of the invention. In contrast to the aforementioned cumulative propagation time vlz, the cumulative propagation time vlze does not contain the propagation time t1. This can be achieved by changing the ISUP signaling in that essentially a further parameter "vlze" is accommodated in the corresponding protocol. As an alternative, it is also conceivable to transmit the propagation time t1 separately to the destination switching node by use of the ISUP signaling and to form the value vlze=vlz−t1 only there. In these cases, the control logic of the service switching point DVK decides on the basis of the comparison vlze=t2+t3>½ elk or vlze=t2+t3+t4>½ elk whether a device for additional echo control available in the network is to be requested. If the condition vlze>½ elk is met, an ECRB information item is sent off as described above.

The described comparison operation in the echo control logic of a switching node to which intelligent peripherals are connected leads to the same result if the intelligent peripheral or, respectively, its access node does not have its own echo cancellation, i.e. if elk=0, since then vlz>0 or, respectively, vlze>0. In this case, too, the result of the comparison leads to an echo control device in the network being requested.

Figure 3B:
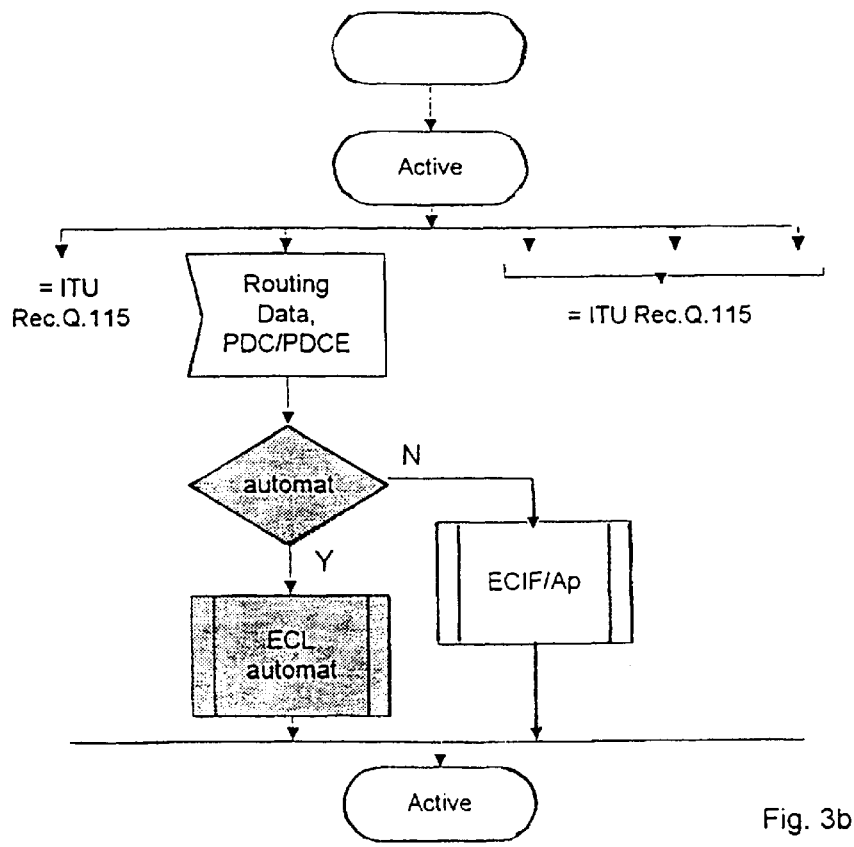
Figure 3C:
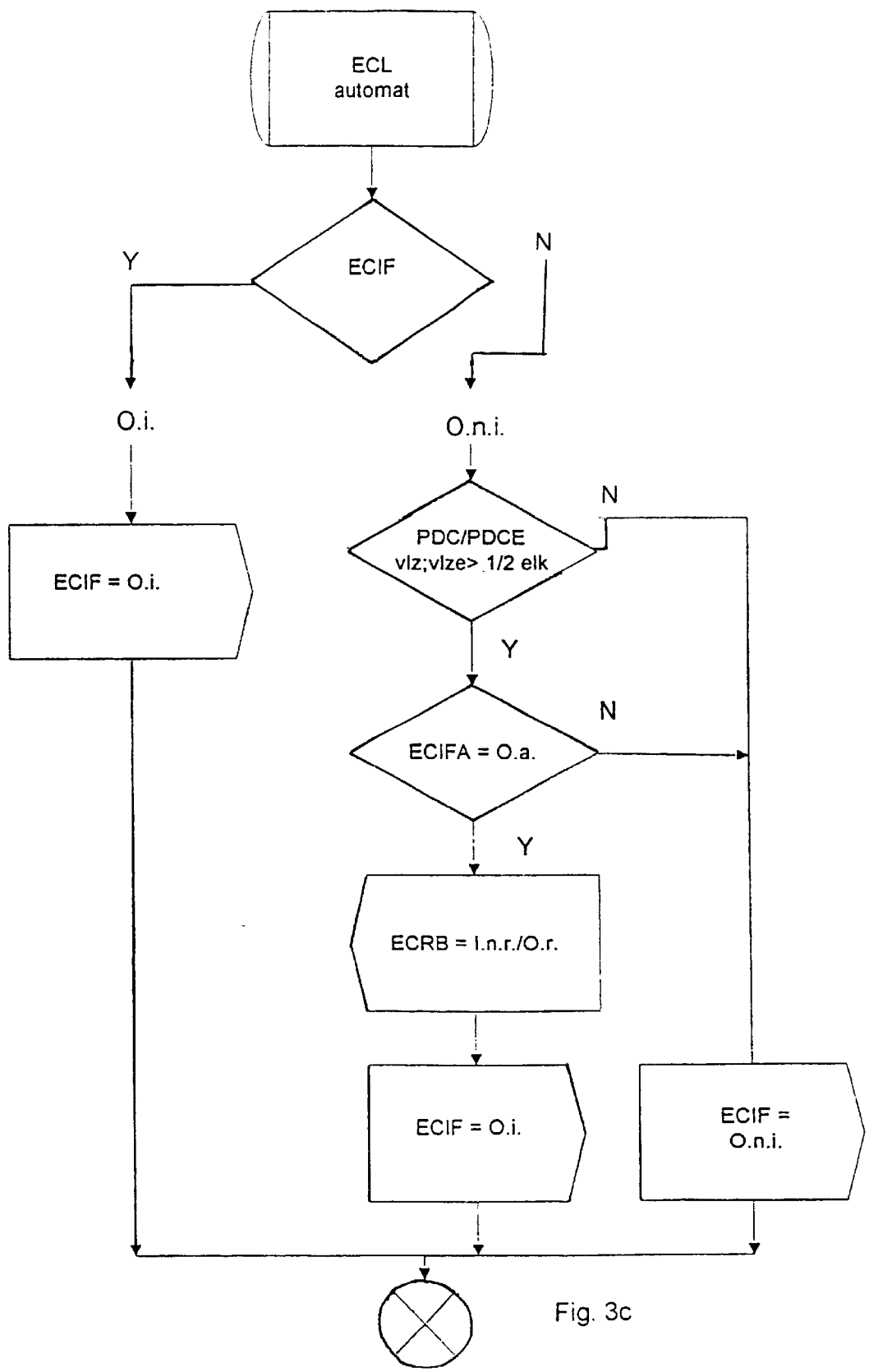

In FIGS. 3a to 3c, details concerning the sequence of the process in the echo control logic ECL of a switching node are shown by an SDL diagram. FIGS. 3a–3c are based on the representation known from ITU Recommendation Q.115 (97) with the designations used there, and additionally contains the relevant method steps in conjunction with the invention, which are shaded for the purpose of clarification. For the sake of simplicity, the same designations as in ITU Recommendation Q.115(97) are used.

FIG. 3a shows the state/event diagram for the echo control logic ECL of a service switching point that is not operated according to ITU Recommendation Q.115(97) due to its configuration in the network. ECIF and ECIFA information arriving when the connection is being set up is stored in the echo control logic of the node and remains stored until the connection has been taken down again. The control logic determines on the basis of the routing data that an intelligent peripheral is connected to the node. Accordingly, an "ECL automat" procedure still to be described is activated.

FIG. 3b shows the state/event diagram for the echo control logic of a network node which, in contrast, is operated according to ITU Recommendation, Q.115(97). The echo control logic determines whether an intelligent peripheral is connected by checking the routing data. If this is so, the "ECL automat" procedure is also called up. If not, the ECIF/Ap procedure is started according to ITU Recommendation Q.115(97). All other elements of the state/event diagram known from ITU Recommendation Q.115(97) remain unchanged. The ITU Recommendation Q.115(97) is hereby incorporated by reference.

FIG. 3c shows details of the "ECL automat" procedure in the echo control logic ECL in the switching node. The procedure contains the below listed steps. On the basis of the ECIF information, a check is made as to whether an echo control device has already been inserted in the connection in the preceding switching node. If not (i.e. ECIF=O.n.i.), the control logic compares the propagation time vlz or, respectively, vlze of the relevant connection, which is specified in the propagation delay counter PDC or PDCE, with the echo propagation time cancellation elk of the connected intelligent peripheral AS. If the condition vlz or vlze>½ elk is not met, no further devices for echo compensation are necessary. If, in contrast, vlz or vlze>½ elk, a check is made whether an ECIFA information item=O.a. is present. This could indicate that an echo control device is available in one of the preceding switching nodes, whereupon the control logic initiates the transmission of an ECRB information item to this node. The ECRB information sent to the switching node has the effect that an echo control device available there is inserted into the link. If, in contrast, there is no ECIFA=O.a. information present, then no echo control device is available in the network. However, this case only occurs if the network has not been configured correctly with respect to the resources for the echo cancellation. If it is found at the beginning of the procedure that an echo control device has already been inserted into the link in the preceding switching node (ECIF=O.i., on the left in the path in the diagram of FIG. 3c), the further steps of the procedure described above are omitted.

I claim:

1. A method for providing echo compensations, which comprises the steps of:

setting up a connection from a terminal to an intelligent peripheral through a communications network, the intelligent peripheral being coupled to an access node of the communications network and has an echo control device for providing echo compensation, the communications network having further echo control devices that can be requested if required and can be inserted into established connections in order to suppress any occurring echo signals;

subsequently, comparing in the access node, a signal propagation time vlz of the connection from the terminal to the intelligent peripheral with a value of an echo propagation time cancellation elk of the echo control device of the intelligent peripheral; and outputting an information item into the communications network to request an addition of one of the further echo control devices in the communications network if $vlz > \frac{1}{2} elk$.

2. The method according to claim 1, which comprises the steps of:

deriving a signal propagation time vlze from an equation:

$$vlze = vlz - t1,$$

where t1 is the signal propagation time between the terminal and an echo source in a further access node of the communications network associated with the terminal;

comparing, in the access node for the intelligent peripheral, the signal propagation time vlze with the value of the echo propagation time cancellation elk of the intelligent peripheral; and outputting the information item into the communications network in order to request an addition of one of the echo control devices available in the communications network if $vlze > \frac{1}{2} elk$.

3. The method according to claim 2, which comprises the step of deriving the signal propagation time vlze by transmitting separately a value of the signal propagation time t1 and then subtracting the value of the signal propagation time t1 from the signal propagation time vlz in the access node for the intelligent peripheral.

4. The method according to claim 2, which comprises the steps of acquiring and deriving in the access node for the intelligent peripheral both the signal propagation time vlz and the signal propagation time vlze.

5. A system for providing echo compensations, comprising:

terminals;

intelligent peripherals each having an echo compensation device generating an echo propagation time cancellation signal elk; and a communications network connecting said terminals to said intelligent peripherals, said communications network having further echo control devices and switching nodes connected to said further echo control devices, said switching nodes including first access nodes for connecting to said intelligent peripherals and second access nodes for connecting to said terminals, said further echo control devices can be requested when required and can be inserted into established connections in order to cancel any echo signals which occur, said first access nodes for said intelligent peripherals have an echo control logic for performing a comparison between one of a first signal propagation time vlz and a second signal propagation time vlze and the echo propagation time cancellation signal elk of said intelligent peripherals, said echo control logic can request that one of said further echo control devices be available if one of $vlz > \frac{1}{2} elk$ and $vlze > \frac{1}{2} elk$ is met.

6. The system according to claim 5, wherein said first access nodes have a propagation delay counter for registering the signal propagation time vlz and a further propagation delay counter for registering the signal propagation time vlze, and propagation time values required for determining the signal propagation time vlz and the signal propagation time vlze can be transmitted to said switching nodes involved in a connection by use of a signaling protocol.

7. In combination with a terminal and an intelligent peripheral having an echo compensation device generating an echo propagation time cancellation signal elk, a system for providing echo compensation in a connection between the terminal and the intelligent peripherals, the system comprising:

a communications network connecting the terminal to the intelligent peripheral, said communications network having further echo control devices and switching nodes connected to said further echo control devices, said switching nodes including a first access node for connecting to the intelligent peripheral and a second access node for connecting to the terminal, said further echo control devices can be requested when required and can be inserted into established connections in order to cancel any echo signals which occur, said first access node for the intelligent peripheral has an echo control logic for performing a comparison between one of a first signal propagation time vlz and a second signal propagation time vlze and the echo propagation time cancellation signal elk of the intelligent peripheral, said echo control logic can request that one of said further echo control devices be available if one of $vlz > \frac{1}{2} elk$ and $vlze > \frac{1}{2} elk$ is met.

8. The system according to claim 7, wherein said first access node has a propagation delay counter for registering the signal propagation time vlz and a further propagation delay counter for registering the signal propagation time vlze, and propagation time values required for determining the signal propagation time vlz and the signal propagation time vlze can be transmitted to said switching nodes involved in a connection by use of a signaling protocol.

* * * * *